United States Patent
Bradley et al.

(10) Patent No.: US 10,657,782 B2
(45) Date of Patent: May 19, 2020

(54) NETWORKED PREMISES SECURITY

(71) Applicant: AT&T Intellectual Property I, L.P., Atlanta, GA (US)

(72) Inventors: Nigel Bradley, McDonough, GA (US); Bhumit Patel, Atlanta, GA (US); Daniel Oberholtzer, Atlanta, GA (US); Alexander MacDougall, Newnan, GA (US); Oliver Elliott, Atlanta, GA (US); Aubree Doernberg, Atlanta, GA (US); Hifza Sakhi, Lilburn, GA (US); Molly Hutsler, Cumming, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 39 days.

(21) Appl. No.: 15/849,981

(22) Filed: Dec. 21, 2017

(65) Prior Publication Data

US 2019/0197848 A1 Jun. 27, 2019

(51) Int. Cl.
*G08B 13/196* (2006.01)
*G08B 29/18* (2006.01)
(Continued)

(52) U.S. Cl.
CPC ....... *G08B 13/19613* (2013.01); *G06Q 10/20* (2013.01); *G06Q 20/00* (2013.01);
(Continued)

(58) Field of Classification Search
CPC ............ G08B 13/19613; G08B 29/188; G08B 13/19656
See application file for complete search history.

(56) References Cited

U.S. PATENT DOCUMENTS

| 5,991,429 A | 11/1999 | Coffin et al. |
| 7,902,978 B2 | 3/2011 | Pederson et al. |

(Continued)

FOREIGN PATENT DOCUMENTS

| CN | 205562838 | 9/2016 |
| CN | 205827461 | 12/2016 |

(Continued)

OTHER PUBLICATIONS

"Nest's Newest Home-Security Camera Will Use Facial Recognition to Identify Those It Records", Associated Press, 2017.
(Continued)

*Primary Examiner* — James J Yang
*Assistant Examiner* — Kevin Lau
(74) *Attorney, Agent, or Firm* — Kilpatrick Townsend & Stockton LLP

(57) ABSTRACT

A premises security system can leverage cloud-based analytics and captured information about a visitor at the premises to provide security to the premises. The system can include a sensor, an actuator, and a local processing device. The sensor can capture information about a visitor to the premises without requiring the visitor to provide the information. The actuator can perform an action with respect to the premises. The local processing device can communicatively couple to a cloud-based analytics system that can analyze the information with respect to one or more databases that include criminal history information, and return data representing a risk rating for the visitor or a command to perform the action. The local processing device can, in response to receiving the data, output a command to the actuator to perform the action.

17 Claims, 7 Drawing Sheets

(51) Int. Cl.
 *G06Q 10/00* (2012.01)
 *G06Q 20/00* (2012.01)
 *G07C 9/00* (2020.01)
 *G07C 1/10* (2006.01)

(52) U.S. Cl.
 CPC ....... *G07C 9/00563* (2013.01); *G08B 29/188* (2013.01); *G07C 1/10* (2013.01); *G08B 13/19656* (2013.01)

(56) References Cited

U.S. PATENT DOCUMENTS

| | | | |
|---|---|---|---|
| 8,701,981 | B2 | 4/2014 | Lyons et al. |
| 8,750,576 | B2 | 6/2014 | Huang et al. |
| 8,848,057 | B2 | 9/2014 | Xu et al. |
| 9,426,432 | B2 | 8/2016 | Scalisi |
| 9,432,631 | B2 | 8/2016 | Allegra |
| 9,524,598 | B2 | 12/2016 | Jang et al. |
| 9,728,026 | B2 | 8/2017 | Wang |
| 10,158,831 | B1 * | 12/2018 | Taub ...................... H04N 7/181 |
| 2002/0070858 | A1 | 6/2002 | Gutta et al. |
| 2009/0080715 | A1 | 3/2009 | van Beek et al. |
| 2010/0111377 | A1 | 5/2010 | Monroe et al. |
| 2014/0037155 | A1 | 2/2014 | Faria et al. |
| 2014/0071273 | A1 | 3/2014 | Balthasar et al. |
| 2014/0076969 | A1 * | 3/2014 | Marshall Chesney ....................... G07C 9/00103 235/382 |
| 2014/0337066 | A1 | 11/2014 | Kephart |
| 2015/0320209 | A1 | 11/2015 | Hasselback |
| 2016/0379046 | A1 | 12/2016 | Crandall |
| 2017/0046896 | A1 | 2/2017 | Schroader |
| 2018/0032612 | A1 * | 2/2018 | Kariman ................ G06F 16/686 |
| 2018/0047230 | A1 * | 2/2018 | Nye ........................ G05B 15/02 |
| 2018/0307903 | A1 * | 10/2018 | Siminoff ............ G06K 9/00369 |
| 2019/0066067 | A1 * | 2/2019 | O'Brien ............. G06Q 20/0658 |

FOREIGN PATENT DOCUMENTS

| | | |
|---|---|---|
| KR | 100772599 | 2/2007 |
| KR | 101419794 | 7/2014 |
| KR | 20160072386 | 12/2014 |
| WO | WO2014101220 | 7/2014 |
| WO | WO2016088401 | 9/2016 |
| WO | WO2017029718 | 2/2017 |
| WO | WO2017120714 | 7/2017 |

OTHER PUBLICATIONS

Owayjan et al., "Face Recognition Security System", American University of Science and Technology (AUST), Departments of Computer and Communications Engineering and Computer Science, Dec. 2013.

Sahani et al., "Web-Based Online Embedded Door Access Control and Home Security System Based on Face Recognition", Department of Electrical and Electronics Engineering, Sikha "O" Anusandham University, Sep. 2015.

TRLICA , "Facial Recognition Security Cameras: A Game-Changing Technology", 2013.

* cited by examiner

NETWORKED PREMISES SECURITY

TECHNICAL FIELD

The present disclosure relates generally to providing security for a location using networked resources. In some aspects, the disclosure relates to providing access control for a location using networked resources.

BACKGROUND

Current household or premises security systems may not provide sufficient security. Crimes where criminals are disguised as expected or normal visitors, such as pizza delivery or plumbing personnel, are at an all-time rise, especially in homes with senior citizens. Security systems are often triggered by forced entries and not by otherwise seemly benign visitors that enter after a household member opens the door or other entryway. Even systems that use cameras to provide video of a premises location to a remote location can be compromised by otherwise innocently looking visitors, such as a delivery person claiming to have the wrong address. And service providers that are expected visitors may commit crimes, and in those situations the security system is often not an obstacle.

SUMMARY

In one example, a system includes a sensor, an actuator, and a local processing device. The sensor is positionable proximate to an entryway into a premises. The sensor can capture information about a visitor to the premises without requiring the visitor to provide the information. The actuator is positionable proximate to the entryway. The actuator is configured to perform an action with respect to the premises. The local processing device is communicatively coupled to the sensor and the actuator. The local processing device includes a network communications port, a processor, and a memory device. The network communications port can communicatively couple to a cloud-based analytics system that is configured to analyze the information with respect to one or more databases that include criminal history information and return to the local processing device data representing a risk rating for the visitor or a command to perform the action. The processor is configured to control the information and the data communicated through the network communications port. The memory device has instructions that are executable by the processor to cause the local processing device to transmit the information to the cloud-based analytics system via the network communications port, receive the data from the cloud-based analytics system via the network communications port, and in response to receiving the data, output a command to the actuator to perform the action.

In another example, a method includes capturing, by a sensor, information about a visitor to a premises without requiring the visitor to provide the information. The method also includes transmitting captured information from the sensor to a cloud-based analytics system by a local processing unit that includes a network communication port through which the captured information is transmitted to a network for receipt by the cloud-based analytics system that analyzes the captured information with respect to one or more databases that include criminal history information to determine a threat category for the visitor. The method also includes receiving, by the local processing device, data representing a risk rating for the visitor or a command to perform an action from the cloud-based analytics system. The method also includes in response to receiving the data, outputting a command to an actuator to perform the action or to perform another action determined by the local processing device.

In another example, a non-transitory computer-readable storage medium including instructions that are executable by a processor to:
control information about a visitor to a premises captured by a sensor without requiring the visitor to provide the information and data communicated through a network communications port to a cloud-based analytics system that is configured to analyze the information with respect to one or more databases that include criminal history information and return the data representing a risk rating for the visitor or a command to perform an action;
transmit the information to the cloud-based analytics system via the network communications port;
receive the data from the cloud-based analytics system via the network communications port; and
in response to receiving the data, output a command to perform the action to an actuator positionable proximate to an entryway to the premises.

The details of one or more aspects and examples are set forth in the accompanying drawings and the description below. Other features and aspects will become apparent from the description, the drawings, and the claims.

DETAILED DESCRIPTION

Figure 1:
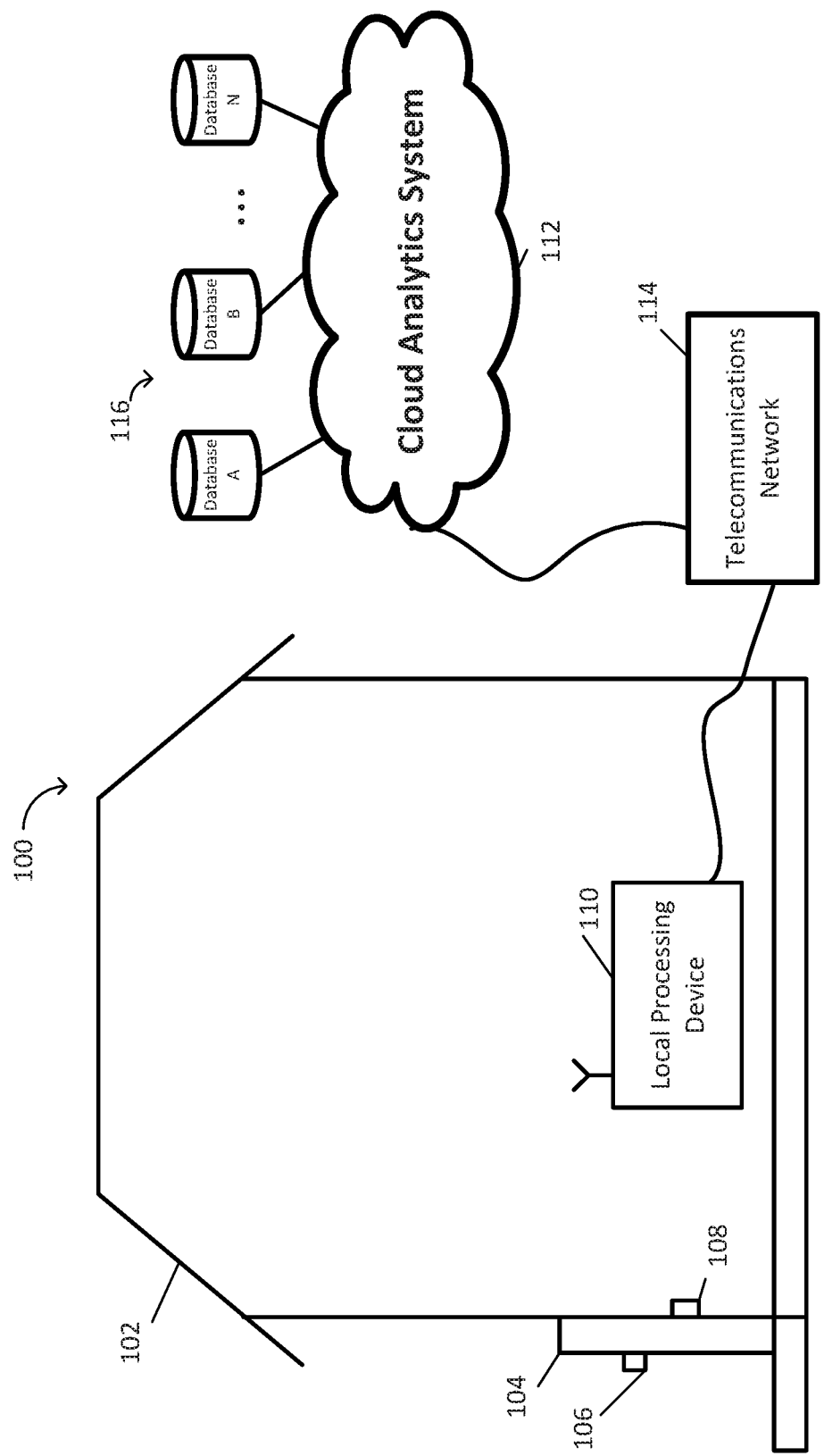
FIG. 1 is a diagram of an environment in which a premises security system can be used according to one example of the present disclosure.

Certain aspects and features of the present disclosure relate to a security system that includes a sensor, such as a camera, to capture information about a visitor to a location and that is communicatively connected to a cloud-based service for analyzing the information and determining an appropriate action in response to the analysis. The system can also include a mechanism at the location to perform a desired action, such as controlling access through entryways by the visitor, or controlling access to segments of the location.

In one example, a premises security system includes a sensor, a local processing device, and a cloud-based analytic system that is communicatively coupled to the local processing device via a network and that can access data in one or more databases. An actuator or other action mechanism may also be included. The sensor and actuator can be positioned proximate to an entryway to the premises with the sensor being positioned to capture information about a visitor without requiring the visitor to proactively provide the information. The local processing device and the cloud-based analytic system can each analyze the captured information about the visitor and determine an action with respect to the visitor based on the analysis. Actions can include preventing the visitor from entering the premises, allowing the visitor to enter the premises, notifying one or more persons that are occupying the premises and other actions.

By using a premises security system according to some examples, a record set of home maintenance records can be maintained by associating service-providing persons visiting the premises, facial recognition against that provided data on premise, and the work invoice from companies interfacing with the system. Records of visitors to a premises can be maintained via automated facial recognition in some examples.

In some examples, data about service-providing personnel from employers can be used by cloud analytics for automatic analysis to determine a threat or be used for access purposes. Automated analytics of premises visitors can be used to provide warnings prior to occupants' engagement with the visitors. Automated actions such as text messages, streaming video sessions, or video calls can be triggered based on facial recognition of visitors on premise.

Age-old security systems can implement significant improvements and connectivity by utilizing emerging technologies such as facial recognition, cloud computing power and speed of analytics, integration and connectivity with service providing companies, and connectivity via notifications or video calling user devices wherever they are. By innovating on security systems, a greater confidence of premises security and convenience can be realized in the scenarios of parents with children who are home alone, children with elderly parents aging in place, families in scenarios of opening the door to unexpected visitors, premises owners away from site, and many others.

In one example, a system can include a network-connected Internet of Things (IOT) camera and a cloud analytics-based system to bolster the security of sites (i.e., premises), and their value. Visitors to a site can be scanned, and facial recognition technology can be used to compare the scans against user-defined access control lists, and cloud-based subscriptions for criminal, sex offender, or any other criminal-related records. For example, the scanned images of visitors can be uploaded to the cloud platform that can maintain access to public-records set that can harness cloud-computing power to quickly compare the person against any number of security checks to which the user is subscribed. Additionally, the system can maintain an access control list locally on the site for frequent visitors. During the definition of these users in the access control list, the system can receive a texted, emailed, or otherwise communicated image that is uploaded to a cloud-based analytics engine for a one-time scan against subscribed security checks. Upon determining a "safe" planned visitor, the facial image can be stored locally onsite for comparison at the time of the visit. Upon determining of a potentially dangerous visitor, the system can notify the user and the user can be prompted for the proper action to take upon the visit by the visitor.

Cloud-based analytics of facial comparisons can include subscription-based searches, where the uploaded image is scanned against any number of criminal databases. Upon completion of this search, a decision can be provided to the local system for indication of potential danger, notification of a visitor, or any other automated action being taken based on user-defined actions for various "threat categories." can be useful in allowing users to text, email, or otherwise upload an image of someone the owner expects to be visiting, and the automated action to be performed upon their arrival. Businesses can be enabled to interface with this system, where upon scheduling of a service on the premises the business also uploads a picture of the technician scheduled to visit the premise. Just like planned visitors, the system can scan the image against the subscribed services for criminal profiling, and upon passing can push the image down to the premises for faster action of user-defined automated actions. Upon recognition of a criminal, the homeowner can be sent a notification with opportunity for further definition of the automated action to take or the opportunity to intervene and request another technician, plan to be home while the technician is performing the service, call the police, or whatever actions the homeowner deems appropriate.

Upon completion of the requested service, the service provider can upload a copy of the invoice. Associating invoices and records of service or repair with a piece of real estate can further enhance a later purchaser of the real estate with knowledge of repair information that can indicate conditions of the home. For example, the invoice, description of work, service company, date, and other information can be stored in a blockchain or another digital storage asset that can provide immutable security to the information and be later accessible to interested persons.

Automation within a system according to some examples can be customized by site owners based on "threat category" scenarios, which can encompass expected guests or unexpected guests, broken down into further categories based on threat profiles. Users can customize any automated action to take per threat category, from electing to unlock the door when defined sets of visitors arrive, or lighting green for non-criminal, sending a text message, or anything in-between.

After a visitor is scanned and the automated action has occurred, the system can upload a record of the visit. This record set can include any type of metadata, such as time of visit, automated action taken, results leading to automated action, and corresponding service invoice. This can bolster security in the event any crime occurs on premise, be used for parents monitoring their children and their visitors, or be used for maintaining home maintenance records indicating potential value.

A system according to some examples can be helpful for individuals who are visually or hearing impaired by informing them whether a criminal or a family friend is at the door through the help of automated audio or visual cues or alarms. Police or other government agencies can use the system to find the last known locations of suspects, a list of locations a suspect may have committed crimes, or otherwise tie them to scenes of crimes and potentially identify persons in the home at the same time as the suspect to wield more information about their whereabouts. This service can also be used to find missing persons by making a radius of their last known locations before they disappeared to make it easier to find them.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

FIG. 1 is a diagram of an environment 100 in which a premises security system can be used according to one example of the present disclosure. The environment includes a premises location 102 that is represented as a house or similar structure. Other examples of the premises location 102 can include a business location, a fenced area, and sub-area within a structure such as a house or other building. The premises location 102 includes an entryway 104, such as a door. The premises security system includes a sensor 106, an actuator 108, a local processing device 110, and a cloud analytics system 112 communicatively coupled to the local processing device 110 via a telecommunications network 114. The cloud analytics system 112 includes, or is in communication with, one or more databases A-N 116 that include data that the cloud analytics system 112 can use to analyze information about visitors.

The telecommunications network 114 can be a wired network, a wireless network, or a combination of one or more wired networks and wireless networks. Examples of the telecommunications network 114 include a cellular network, a telecommunications backhaul, a cellular telecommunications network backhaul, a WiFi mesh network, a distributed antenna system, and an Ethernet network.

In FIG. 1, the local processing device 110 can communicatively couple to the sensor 106 and the actuator 108 by a wireless communication channel—e.g., WiFi, Bluetooth™, or other near-field communication protocol. In other examples, however, the local processing device 110 can communicatively couple to one or more of the sensor 106 or the actuator 108 by a wired connection, such as via an Ethernet cable. In addition, in some examples, the local processing device is part of the sensor 106 or the actuator 108, rather than a separate component as shown in FIG. 1.

The sensor 106 can capture information about a visitor to the premises location 102 without requiring to proactively provide the information. The sensor 106 can communicate the captured information to the local processing device 110 for further processing or distribution. Examples of the sensor 106 include a camera, such as an Internet of Things (IOT) camera, that can capture a facial image of the visitor, or at least data points about facial features of the visitor.

The captured information can be analyzed by the local processing device 110, the cloud analytics system 112, or both the cloud analytics system 112 and the local processing device 110, to assess the relative risk of the visitor or to control access by the visitor to the premises. For example, the local processing device 110 can compare the captured information to stored information representing facial features of approved visitors to determine whether the visitor is an approved visitor. Or the local processing device 110 can provide the captured information to the cloud analytics system 112 via the telecommunications network 114 and the cloud analytics system 112 can compare the captured information to one or more of the databases 116, which may contain criminal history information, to assess a level of risk that the visitor poses, which can be returned to local processing device 110 for action.

The local processing device 110 can take a variety of actions in response to the level of threat assessed for the visitor or the verification of identity and inclusion or exclusion from an approved visitor list. In some examples, the local processing device 110 determines the action to take based on the information. In another example, the cloud analytics system 112 determines the action to take and provides the instruction on the action to the local processing device 110. One example of an action can include controlling the actuator 108 to lock or unlock the door. The local processing device 110 can output a signal, wirelessly or via a wireline connection to the actuator 108, to command the actuator 108 to unlock the door (for example, in response to determining that the visitor is an approved visitor), or to maintain the door in a lock state (or to change the door to the lock state), or change a state of the door in some other fashion (such as by causing an additional entry-prevention mechanism, such as a steal door, to be placed in the entryway). Other examples of actions include outputting a notification to a user device, such as a mobile telephone, to alert the user about the visitor and to receive confirmation that the visitor is to be allowed into the premises location 102.

The local processing device 110 can also output commands to save data and information about a visitor, the visit, and actions to a storage device that can be accessible remotely and subsequently. For example, the storage device can store the data and information in a blockchain that is accessible to understand the maintenance history of the premises location and the costs involved.

Figure 2:
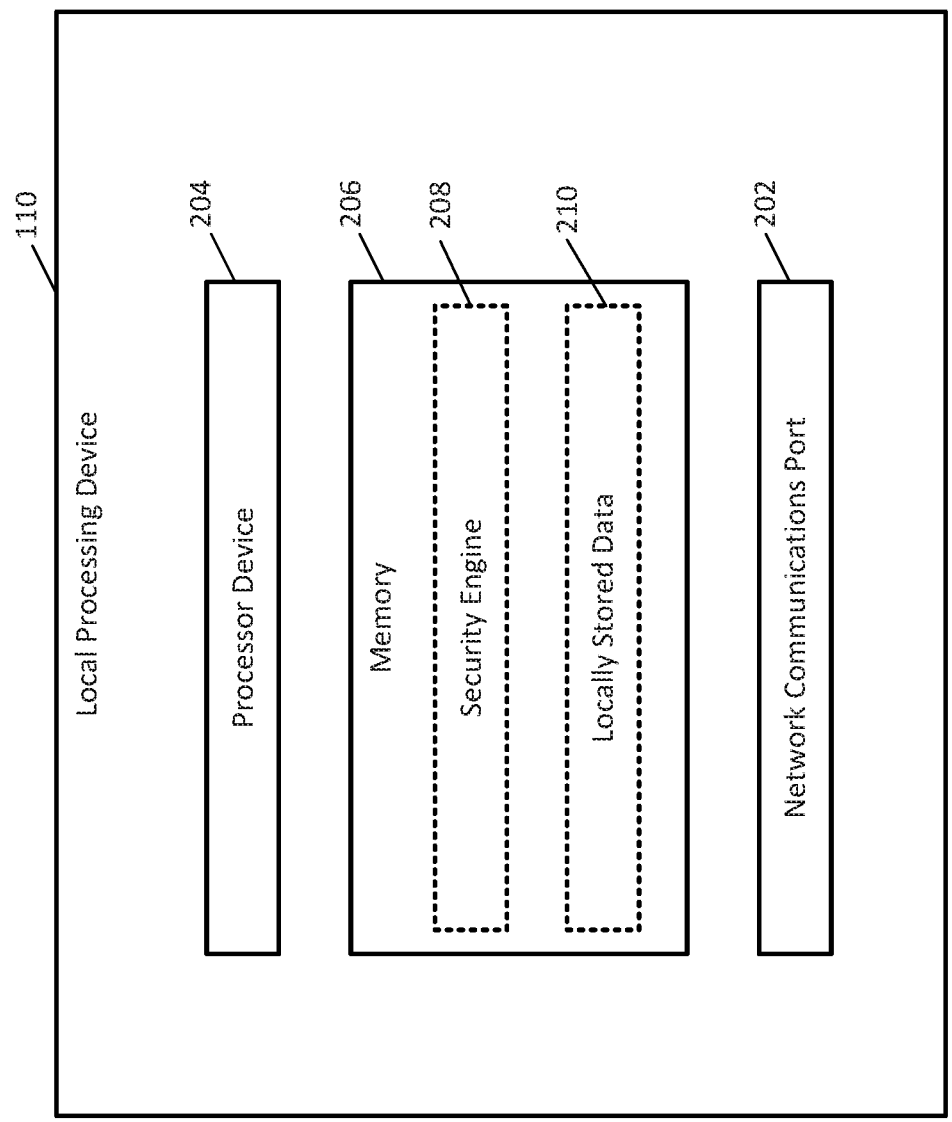
FIG. 2 is a block diagram of a local processing device for a premises security system according to one example of the present disclosure.

FIG. 2 is a block diagram of a local processing device for a premises security system according to one example of the present disclosure. The local processing device 110 includes a network communications port 202, a processor device 204, and a memory device 206. In some examples, the local processing device 110 can also include an antenna (not shown) integrated with the local processing device 110 coupled to the local processing device 110 through the network communications port 202.

Non-limiting examples of the processor device 204 include a Field-Programmable Gate Array (FPGA), an application-specific integrated circuit (ASIC), a microprocessor, etc. The processor device 204 can execute one or more operations for analyzing captured information, managing network communication, and outputting commands for action. The processor device 204 can execute instructions stored in the memory device 206 to perform the operations. In some examples, the instructions can include processor-specific instructions generated by a compiler or an interpreter from code written in any suitable computer-programming language, such as C, C++, C #, etc.

Non-limiting examples of the memory device 206 include electrically erasable and programmable read-only memory (EEPROM), flash memory, or any type of non-volatile memory. In some examples, the memory device 206 can include a medium from which the processor device 204 can read instructions. A computer-readable medium can include electronic, optical, magnetic, or other non-transitory storage devices capable of providing the processor device 204 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read instructions.

The memory device 206 can include instructions such as a security engine 208 that can be executed by the processor device 204 for performing various operations in analyzing captured information, managing communications, and outputting commands for actions. The memory device 206 also includes locally stored data 210 that can used by the security engine 208 in analyzing the captured information and identifying network locations, at least locally, for outputting commands to perform actions.

The network communications port 202 can include one or more ports that provide a physical layer and a communication protocol for exchanging data and information with one or more other systems, such as a cloud analytics system. Examples of the network communications port 202 include an Ethernet port, a serial port, and an antenna port.

Figure 3:
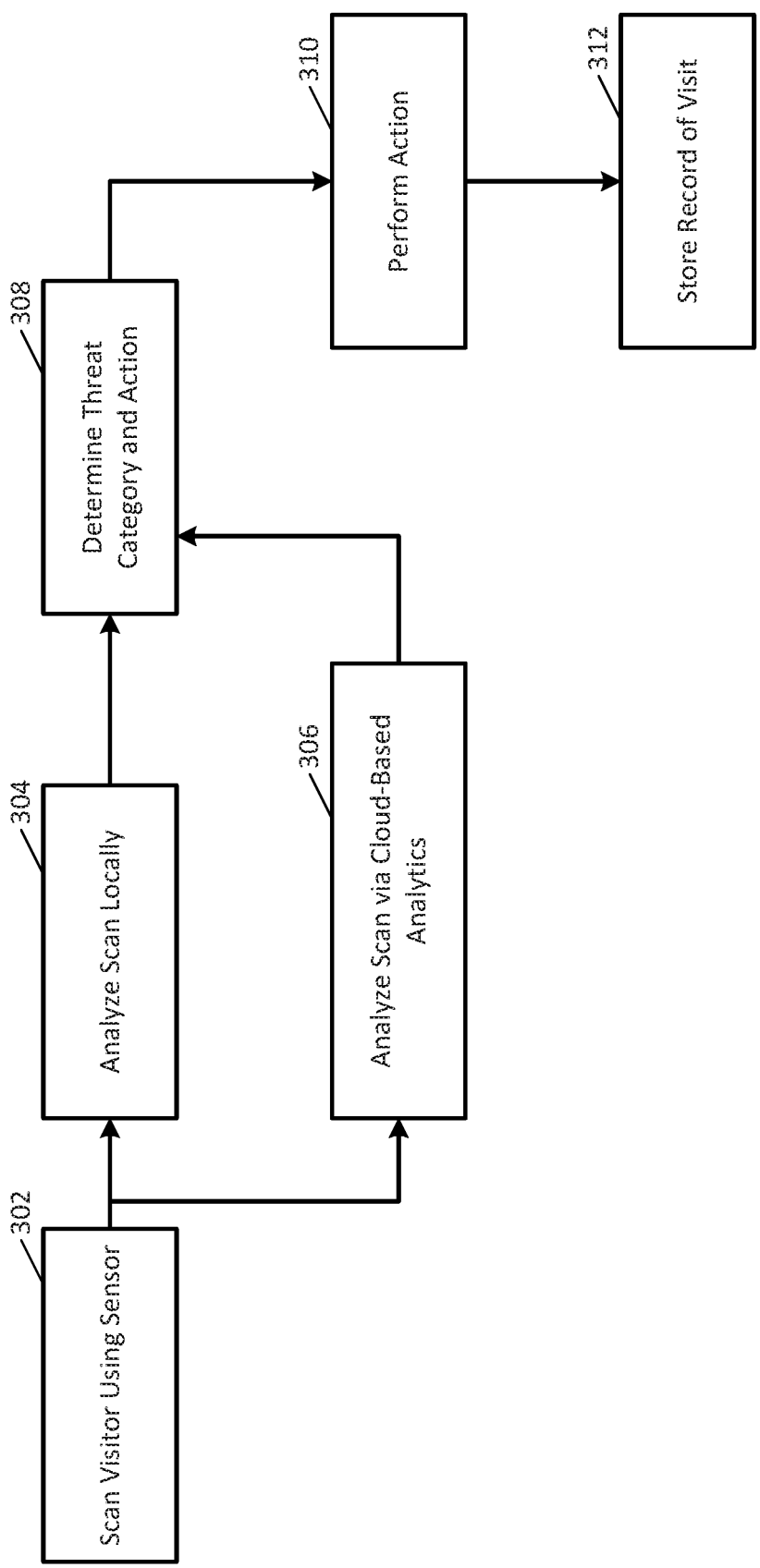
FIG. 3 is a flow diagram of a process for protecting or controlling access to a premises by a premises security system according to one example of the present disclosure.

FIG. 3 is a flow diagram of a process for protecting or controlling access to a premises by a premises security system according to one example of the present disclosure. In block 302, a sensor is used to scan the visitor. The sensor, in some examples, can be a camera, such as an IOT camera positioned in a keyhole or at a doorbell of a door, that can capture an image of the face of the visitor. In other examples, the sensor is a biometric device to capture a fingerprint or a thumbprint, gait, or other identifiable feature of the visitor.

In block 304, the scanned information about the visitor is analyzed locally. For example, the scanned information can be analyzed by a local processing device positioned in or proximate to the premises location. The local processing device can compared the scanned information to stored information to determine a level of risk of the visitor or to control access to the premises location.

In block 306, the scanned information about the visitor is analyzed by cloud-based analytics. In some examples, the scanned information is analyzed by the local processing device and by cloud-based analytics at the same time. In other examples, the scanned information is analyzed by one of the local processing device or the cloud-based analytics and then subsequently analyzed by the other of the local processing device or the cloud-based analytics. Cloud-based analytics can involve comparing the scanned information to databases to determine a match and determine a background of the visitor, verifying the identity of the visitor via comparisons to a database, or another process.

Based on the analysis from the local processing device and the cloud-based analytics, the local processing device or the cloud-based analytics determine the threat category for the visitor and an action. Threat categories can be configurable based on user-desired comfort level and the level of protection desired for the premises location. For example, threat categories can include high, medium, and low. A low category can correspond to confirmation that this is a repeat visitor without any negative background information. A medium category can correspond to a visitor for which there is no information for which the company employing the visitor did not provide confirming information, and may also correspond to some, but minor background information being found. A high category can correspond to negative background information being found and a "no match" between information provided by the company employing the visitor and the visitor, or it can correspond to the visitor being identified as a band visitor.

In block 310, the action is performed. The action can be based on the threat category. Examples of actions can include causing the door to unlock, causing the door to lock or maintaining the door to remain in a locked state, and outputting a notification to an occupier of the premises location. In some examples, the action can be performed by the local processing device outputting a command to an actuator or another mechanism.

In block 312, a record of the visit can be stored. The record can be stored locally, remotely, or both. In some examples, the record can be stored in a blockchain that is immutable and that can be accessed subsequently.

Figure 4:
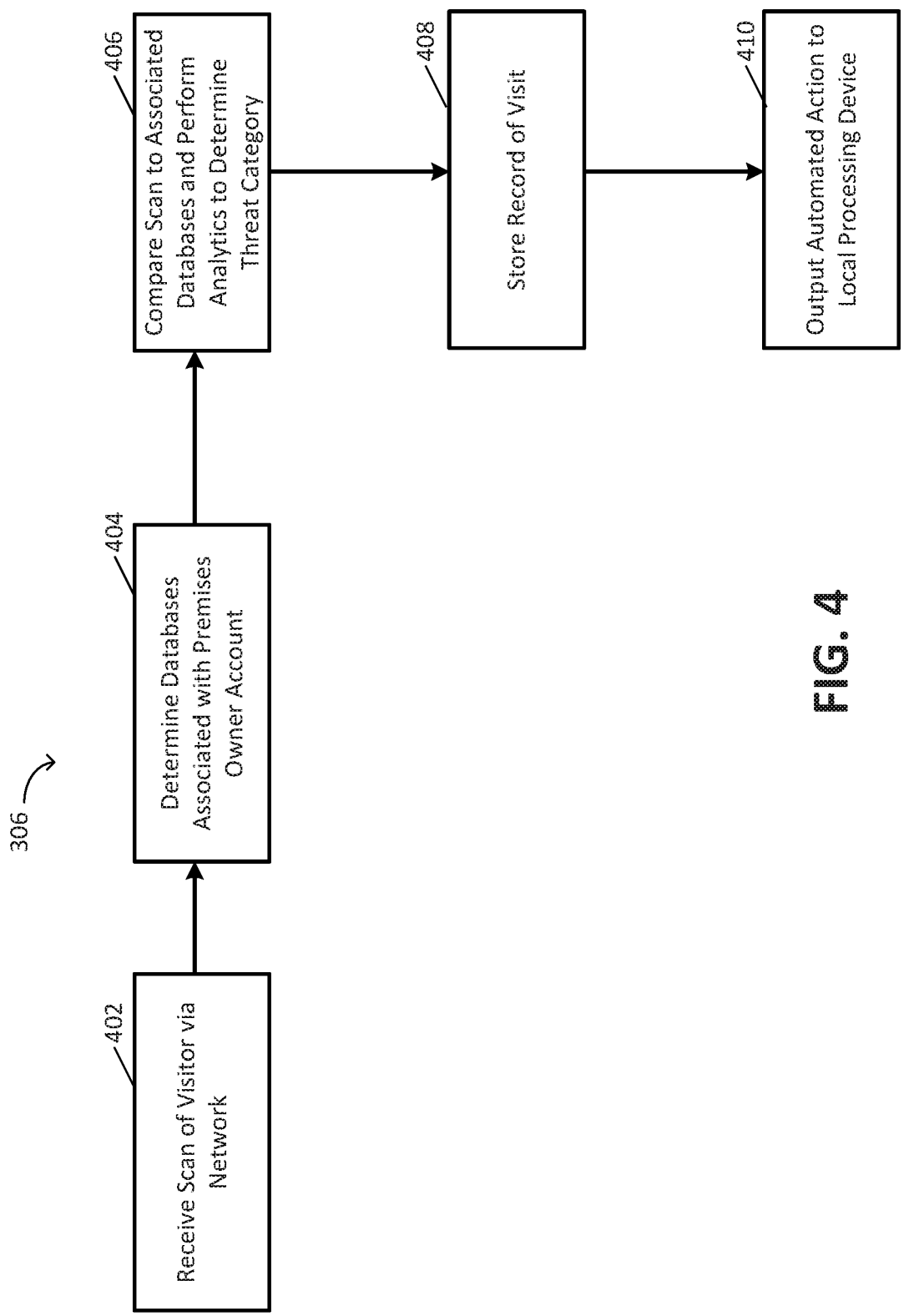
FIG. 4 is a flow diagram of a process for a cloud-based analytics system of a premises security system according to one example of the present disclosure.

FIG. 4 is a flow diagram of a process for a cloud-based analytics system of a premises security system in performing block 306 from FIG. 3 according to one example of the present disclosure. In block 402, the cloud-based analytic system receives a scan of the visitor via a network. In block 404, the system determines the databases associated with the account of the premises owner. Examples of databases can include a criminal search database, a company cross-reference, sex offender registry, and home records.

In block 406, the scan of the visitor is compared to the databases associated with the account and the comparison results are analyzed to determine the threat category for the visitor. Examples of the types of threat categories include no criminal history found, criminal history found, verification that the visitor is a previous visitor, the visitor is unknown, the visitor is expected, and the visitor is a resident of the premises location.

The record of the visit of the visitor can be stored in block 408. And in block 410, an automated action is outputted to the location processing device. Examples of automated access include granting or denying access to the premises location and sending notifications via text, email, push notifications, or visual or audible notifications.

Figure 5:
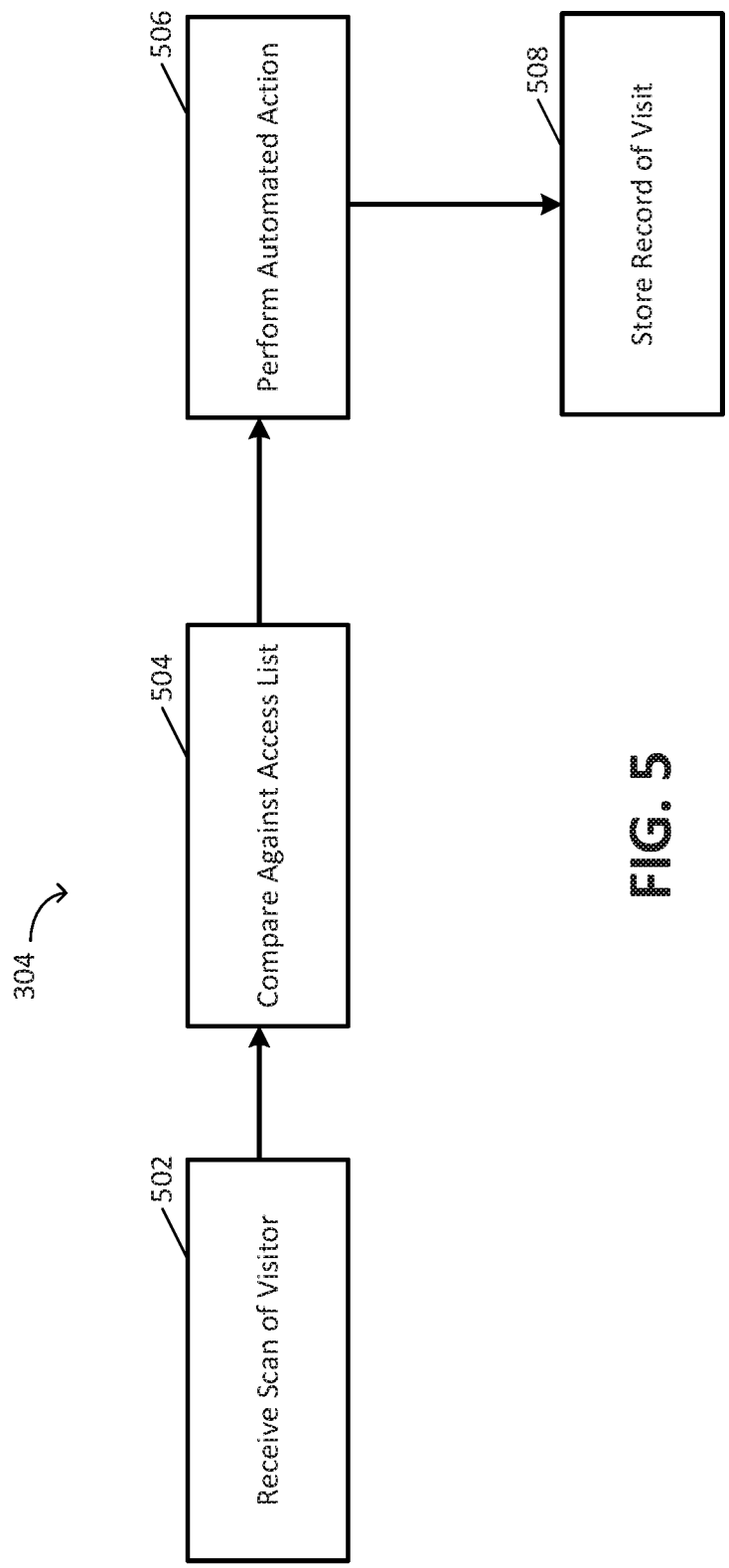
FIG. 5 is a flow diagram of a process for a local processing device of a premises security system according to one example of the present disclosure.

FIG. 5 is a flow diagram of a process for a local processing device of a premises security system in performing block 304 of FIG. 3 according to one example of the present disclosure. In block 502, the local processing device receives a scan of the visitor and, in block 504, compares the scan against an access list stored in the memory of the local processing device.

Figure 6:
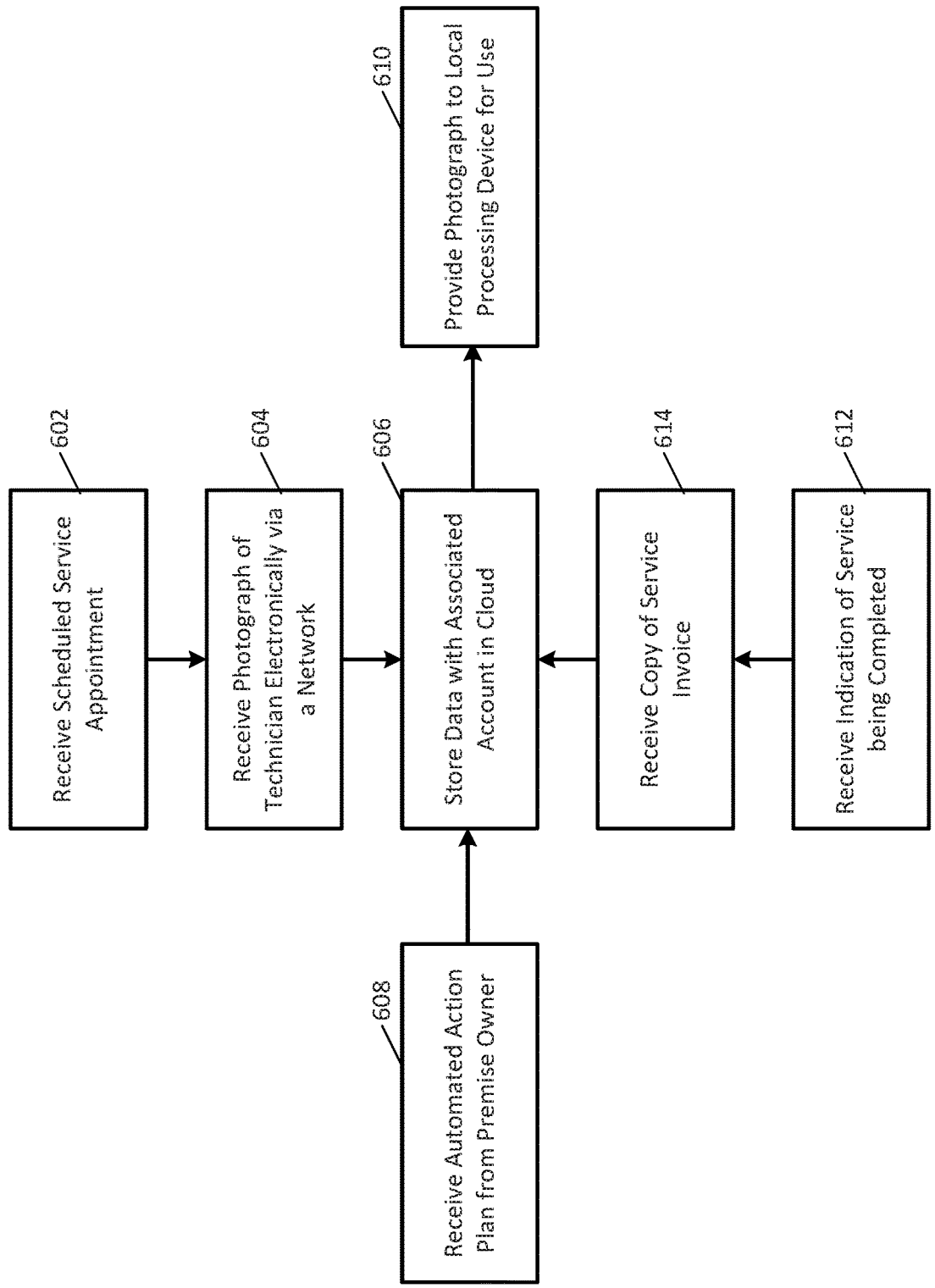
FIG. 6 is a flow diagram of process for a premises security system with inputs from a service provider according to one example of the present disclosure.

FIG. 6 is a flow diagram of process for a premises security system with inputs from a service provider according to one example of the present disclosure. In block 602, the system receives a scheduled service appointment. The system can receive the scheduled service appointment via the local processing device or the cloud-based system. The scheduled service appointment can be received electronically via a network from a user device or from a company computing system. The scheduled service appointment can include the date of planned service, an estimated time of arrival for a technician, and a name of the technician.

In block 604, the system can receive an image, such as a photograph, of the technician that is planning to provide service at the premises location. The photograph can be received electronically via a network by the local processing device or the cloud-based system. For example, the photograph can be represented by electronic data that includes represents facial features of the technician. In other examples, the system can receive other types of data in addition to, or as an alternative to, the photograph. Examples of other types of data include any general metadata, biometric data (such as gait analysis, radio frequency identification information, a QR code representative of information, or another type of data). The scheduled appointment information and the photograph (or other type of data) can be stored and associated with the account in the cloud in block 606. For example, a tag can be applied to each dataset, including the account, so that the data is related together for subsequent analysis and processing.

In block 608, the system receives and automated action plan from an owner of the premises location. The action plan can include a list of actions and description of scenarios for each action to apply. For example, the action may be "unlock door" and the scenario can include "John Doe from Company X" or "any technician from Company X," etc. The action plan can be stored and associated with the account in the cloud.

In block 610, the photograph, or potentially other information, of the technician can be provided to the local processing device and stored for use in analyzing facial feature of a visitor that arrives at the premises location such that the local processing device can verify identity of the technician as compared to the photograph of the technician that the company sent, and take action based on that verification. By doing so, processing resources can be saved because the local processing device would not necessarily be required to communicate with the cloud-based system to perform analytics on the scanned information. In other examples, other types of biometric comparisons can be implemented. Examples of these include video-based gait analysis, QR comparison and scanning, or iris scan.

In block 612, the system receives an indication that the service has been completed. The indication can be received from the camera detecting that the technician is leaving the premises location, from a user device confirming completion, from the company system in response to a notice from the technician, or other ways. The indication that the service has been completed can be received by the local processing device or the cloud-based analytic system.

In block 614, the system receives a copy of a service invoice. The service invoice can be received electronically by the local processing device or the cloud-based analytic system via a network. The service invoice can include electronic data that indicates the type of service performed and the amount due for the service. Other data, such as date of service and location of service, can also be included. The indication of the service being completed and the service invoice can be stored and associated with the account in block 606. The data can be stored in an immutable and accessible way, such as via a blockchain, to maintain a record of maintenance on the premises location, which can be accessible to future buyers for valuation purposes.

Figure 7:
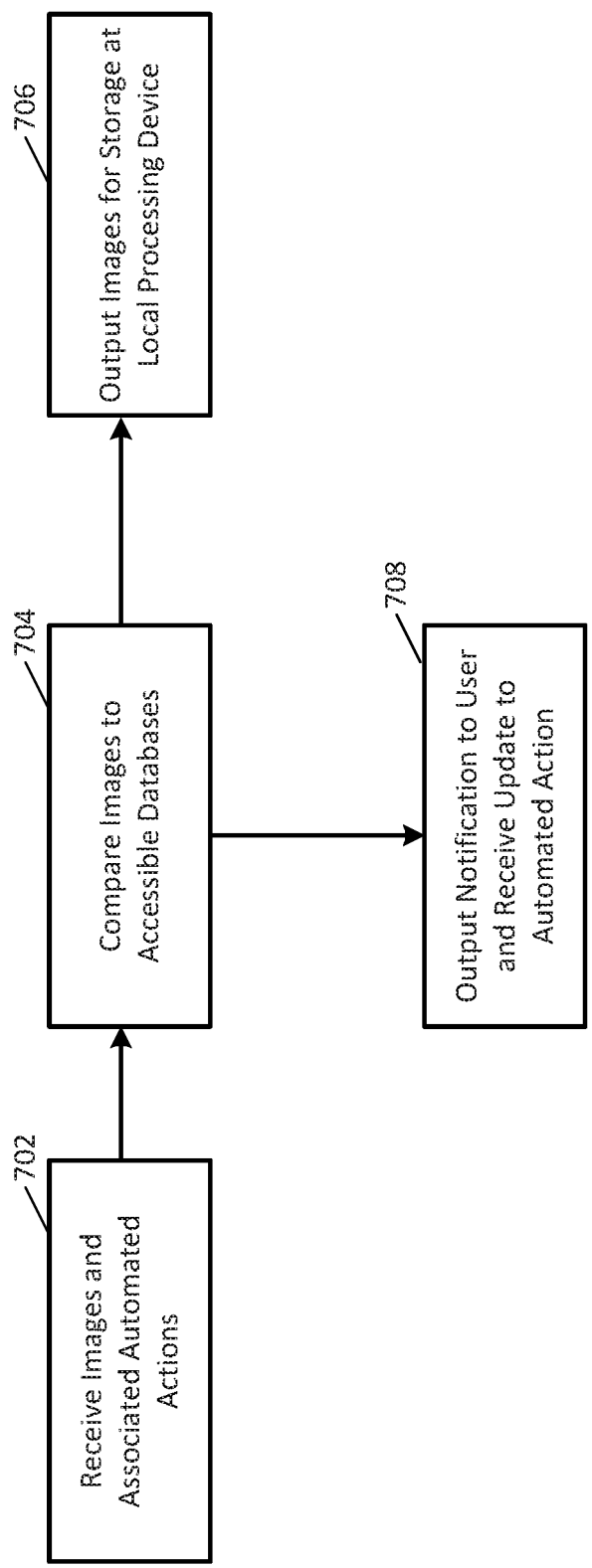
FIG. 7 is a flow diagram for setting up an access control list for a premises security system according to one example of the present disclosure.

FIG. 7 is a flow diagram for setting up an access control list for a premises security system according to one example of the present disclosure. In block 702, images and associated automated actions can be received by the system. In some examples, the images can be pictures for access control—that is, pictures of visitors that should be granted access to the premises location and, optionally, pictures of visitors that should not be granted access to the premises location—and the automated actions can be received electronically in the form of metadata associated with the pictures. The images can be received via user input, directly into the local processing device by a user device or via a network connection with a user device.

In block 704, the images are compared to accessible or subscribed databases by a cloud analytics system to check the history of the visitors. In response to detecting a threat or a match to a criminal database, for example, the system can output a notification to the user and receive an update to the automated action in block 708. The notification can indicate the threat category for the visitor or include data about the specific threat determined from the historical data compared using the picture. The update to the automated action can include an electronic representation of a change to the automated action and the system can associate the updated automated action with the image of the particular visitor to which the automated action relates.

In block 706, the images and associated automated action can be electronically provided by the cloud-based system via the network to the local processing device for storage. The local processing device can use the data to analyze a captured image of a visitor and determine an action for the visitor, potentially without further accessing the cloud-based system.

Premises security systems according to some examples can be used to cross-reference each visitor seeking entry into the premises location against a set of image databases, including those of sex offenders, criminals, previously arranged service providers in the area, or any facial comparison system. Faces of family members and friends can also be added via the access control list process to control access easily and automatically. Maintenance records can be easily stored and later accessible to substantiate value-added maintenance, such as adding a new bathroom or finishing a basement, and for other valuation reasons of a premises location.

A premises security system can be used to enhance security at both private homes and more public locations. In addition to private homes, examples of premises locations include gated communities, gated resorts, gated parking lots, private clubhouses, and schools. A premises security system can be useful for individuals that are visually or hearing impaired by informing those individuals via auditory or visual indications whether a criminal or a family friend is at the door.

Police, FBI, and other law enforcement may use a premises security system according to some aspects to find the last known location of suspects, a list of locations that a suspect may have committed crimes, or otherwise tie criminals to scenes of crimes, and potentially identify persons in the home at the same time as the criminal to help locate the criminal. A system according to some examples may also be used to find missing person by making a radius of the last known location before disappearance.

The foregoing description of the examples, including illustrated examples, of the subject matter has been presented only for the purpose of illustration and description and is not intended to be exhaustive or to limit the subject matter to the precise forms disclosed. Numerous modifications, adaptations, and uses thereof will be apparent to those skilled in the art without departing from the scope of this subject matter. The illustrative examples described above are given to introduce the reader to the general subject matter discussed here and are not intended to limit the scope of the disclosed concepts.

What is claimed is:

1. A system comprising: a sensor positionable proximate to an entryway into a premises, the sensor being configured to capture information about a visitor to the premises without requiring the visitor to provide the information; an actuator positionable proximate to the entryway, the actuator being configured to perform an action with respect to the premises; a local processing device communicatively coupled to the sensor and the actuator, the local processing device comprising: a network communications port for communicatively coupling to a cloud-based analytics system that is configured to analyze the information with respect to one or more databases that include criminal history information and return to the local processing device data representing a risk rating for the visitor or a command to perform the action; a processor configured to control the information and the data communicated through the network communications port; and a memory device having instructions that are executable by the processor to cause the local processing device to: transmit the information to the cloud-based analytics system via the network communications port; receive the data from the cloud-based analytics system via the network communications port; in response to receiving the data, output a command to the actuator to perform the action; and add visit information to a blockchain stored remotely from the local processing device, the blockchain includes immutable data that is subsequently accessible, the visit information representing a confirmation of a visit and is configured to be added to visit data included in the blockchain, the visit data comprising (i) an identification of the visitor and a name of a service company associated with the visitor, (ii) a date of a visit by the visitor, and (iii) a description of maintenance performed at the premises by the visitor.

2. The system of claim 1, wherein:
the sensor is an Internet of Things (IOT) camera positionable in or on a door of the premises, the camera being configured to capture an image representing a face of the visitor,
the local processing device is configured to transmit the image representing the face of the visitor to the cloud-based analytics system that is configured to biometrically compare facial features from the image to the one or more databases and return the risk rating or the command to perform the action,
the actuator is a lock-control device configured to control a lock on a door of the entryway to the premises.

3. The system of claim 2, wherein
the cloud-based analytics system is configured to return the risk rating, the risk rating representing a likelihood that the visitor is a person that is expected to visit or a likelihood that the visitor will commit a crime at the premises,
the local processing device is configured to determine that the lock on the door should remain locked or should be unlocked in response to the risk rating for the visitor, and to output the command to the actuator to lock the door or to unlock the door.

4. The system of claim 2, wherein the cloud-based analytics system is configured to receive a photograph of the visitor electronically from a service company associated with the visitor and to compare the image to the photograph.

5. The system of claim 1, wherein the local processing device or the cloud-based analytics system is configured to output a notification about the visitor via a telecommunications network to a user device.

6. The system of claim 1, wherein the cloud-based analytics system is configured to determine the action to be performed and return the command to perform the action to the local processing device.

7. A method comprising: capturing, by a sensor, information about a visitor to a premises without requiring the visitor to provide the information; transmitting, by a local processing device, captured information from the sensor to a cloud-based analytics system by a local processing unit that includes a network communication port through which the captured information is transmitted to a network for receipt by the cloud-based analytics system that analyzes the captured information with respect to one or more databases that include criminal history information to determine a threat category for the visitor; receiving, by the local processing device, data representing a risk rating for the visitor or a command to perform an action from the cloud-based analytics system; in response to receiving the data, outputting a command to an actuator to perform the action or to perform another action determined by the local processing device; and adding visit information to a blockchain stored remotely from the local processing device, the blockchain includes immutable data that is accessible subsequent to the visit information being added to the blockchain, the visit information representing a confirmation of a visit and is added to visit data included in the blockchain, the visit data comprising (i) an identification of the visitor and a name of a service company associated with the visitor, (ii) a date of a visit by the visitor, and (iii) a description of maintenance performed at the premises by the visitor.

8. The method of claim 7, wherein:
the sensor is an Internet of Things (IOT) camera positioned in or on a door of the premises, the camera capturing an image representing a face of the visitor,
the local processing device transmits the image representing the face of the visitor to the cloud-based analytics system that biometrically compares facial features from the image to the one or more databases and returns the risk rating or the command to perform the action,
the actuator is a lock-control device that controls a lock on a door of an entryway to the premises.

9. The method of claim 8, wherein the local processing device:
receives the risk rating from the cloud-based analytics system, the risk rating representing a likelihood that the visitor is a person that is expected to visit or a likelihood that the visitor will commit a crime at the premises,
determine that the lock on the door should remain locked or should be unlocked in response to the risk rating for the visitor, and
output the command to the actuator to lock the door or to unlock the door.

10. The method of claim 8, wherein the risk rating is based on the cloud-based analytics system receiving and analyzing a photograph of the visitor electronically from a service company associated with the visitor.

11. The method of claim 7, further comprising:
outputting a notification about the visitor via a telecommunications network to a user device.

12. The method of claim 7, further comprising:
receiving, by the local processing device and from the cloud-based analytics system, a threat category for the visitor and the action to be performed that corresponds to the threat category, wherein the threat category includes at least one of:
no criminal history;
criminal history exists;
verification as a previous visitor;
verification as an unknown visitor;
verification as an expected visitor; or
verification as a resident of the premises.

13. A non-transitory computer-readable storage medium including instructions that are executable by a processor to: control information about a visitor to a premises captured by a sensor without requiring the visitor to provide the information and data communicated through a network communications port to a cloud-based analytics system that is configured to analyze the information with respect to one or more databases that include criminal history information and return the data representing a risk rating for the visitor or a command to perform an action; transmit the information to the cloud-based analytics system via the network communications port; receive the data from the cloud-based analytics system via the network communications port; in response to receiving the data, output a command to perform the action to an actuator positionable proximate to an entryway to the premises; and add visit information to a blockchain stored remotely from a local processing device configured to include the non-transitory computer-readable storage medium, the blockchain includes immutable data that is subsequently accessible, the visit information representing a confirmation of a visit and is configured to be added to visit data included in the blockchain, the visit data comprising (i) an identification of the visitor and a name of a service company associated with the visitor, (ii) a date of a visit by the visitor, and (iii) a description of maintenance performed at the premises by the visitor.

14. The non-transitory computer-readable storage medium of claim 13, wherein the instructions are executable by the processor to:

receive information from the sensor that is an Internet of Things (IOT) camera positionable in or on a door of the premises, the information including an image representing a face of the visitor;

transmit the image representing the face of the visitor to the cloud-based analytics system that is configured to biometrically compare facial features from the image to the one or more databases and return the risk rating or the command to perform the action; and output the command to the actuator to perform the action that involves controlling a door of the entryway to the premises.

15. The non-transitory computer-readable storage medium of claim 14, wherein the instructions are executable by the processor to:

receive the risk rating from the cloud-based analytics system, the risk rating representing a likelihood that the visitor is a person that is expected to visit or a likelihood that the visitor will commit a crime at the premises; and determine that a lock on the door should remain locked or should be unlocked in response to the risk rating for the visitor, and output the command to the actuator to lock the door or to unlock the door.

16. The non-transitory computer-readable storage medium of claim 14, wherein the instructions are executable by the processor to:

receive the risk rating that is based on analysis by the cloud-based analytics system of a photograph of the visitor received electronically from a service company associated with the visitor.

17. The non-transitory computer-readable storage medium of claim 13, wherein the instructions are executable by the processor to output a notification about the visitor via a telecommunications network to a user device.

* * * * *